United States Patent [19]

Andrews et al.

[11] Patent Number: 4,772,649
[45] Date of Patent: Sep. 20, 1988

[54] POLYESTERAMIDE AND SUFFICIENT CARBODIIMIDE TO IMPART IMPROVED COMPRESSION SET

[75] Inventors: Philip S. Andrews, Hamden; Augustin T. Chen, Cheshire; Kemal Onder, North Haven; Laura B. Weaver, Prospect, all of Conn.

[73] Assignee: The Dow Chemical Company, Midland, Mich.

[21] Appl. No.: 943,104

[22] Filed: Dec. 18, 1986

[51] Int. Cl.$^4$ .......................... C08K 5/29; C08J 61/00; C08F 283/04
[52] U.S. Cl. .................... 524/195; 524/513; 528/288; 525/424; 525/425
[58] Field of Search ................ 528/288; 524/195, 513; 525/424, 425

[56] References Cited

U.S. PATENT DOCUMENTS

| | | | |
|---|---|---|---|
| 3,193,522 | 7/1965 | Neumann et al. | 524/195 |
| 3,193,523 | 7/1965 | Neumann et al. | 560/2 |
| 3,193,524 | 7/1965 | Holtschmidt et al. | 523/508 |
| 3,226,368 | 12/1965 | Reischl et al. | 528/51 |
| 3,635,878 | 1/1972 | Gebura | 523/207 |
| 3,776,882 | 12/1973 | Witzler et al. | 524/195 |
| 3,975,329 | 8/1976 | Barnewall et al. | 524/195 |
| 4,113,676 | 9/1978 | Niederst | 524/195 |
| 4,129,715 | 12/1978 | Chen et al. | 528/67 |
| 4,649,180 | 3/1987 | Chen et al. | 525/462 |

FOREIGN PATENT DOCUMENTS

| | | | |
|---|---|---|---|
| 1494009 | 5/1969 | Fed. Rep. of Germany | 524/195 |
| 0765048 | 5/1971 | France | 524/195 |
| 0621135 | 1/1981 | Switzerland | 524/195 |

Primary Examiner—Harold D. Anderson
Assistant Examiner—Dennis R. Daley
Attorney, Agent, or Firm—James S. Rose

[57] ABSTRACT

Disclosed are novel blends comprising segmented polyesteramides with minor amounts of carbodiimide containing materials.

The blends are characterized by excellent physical properties and improved compression set characteristics over the polyesteramides in the absence of the carbodiimide component. This allows the polymers obtained to find utility in the making of seals or gaskets which heretofore the base polyesteramides could not satisfy.

15 Claims, No Drawings

POLYESTERAMIDE AND SUFFICIENT CARBODIIMIDE TO IMPART IMPROVED COMPRESSION SET

FIELD OF THE INVENTION

This invention relates to modified polyesteramides and is more particularly concerned with blends of segmented polyesteramides with carbodiimides.

DESCRIPTION OF THE PRIOR ART

Segmented polyesteramides of the type disclosed in U.S. Pat. No. 4,129,715 and copending U.S. application Ser. No. 840,248 filed Mar. 17, 1986, now U.S. Pat. No. 4,649,180, are characterized by a combination of very useful properties such as good high temperature resistance, wide range of hardness values, and excellent tensile properties including good elongation. These properties are combined in materials which are readily injection moldable into complicated shapes. One property of these polymers in which they are somewhat lacking is compression set characteristics. Compression set as determined by ASTM D395 Test Method B measures the compression set or the percent permanent compression of a sample after it has been compressed under constant deflection to 75 percent of its original thickness for a set period of time under standardized temperature conditions. The compression set properties of the above polyesteramides are such that they are excluded from use as gasketing materials under rigorous conditions. A solution to this problem has been sought for considerable time without success.

U.S. Pat. Nos. 3,193,522 and 3,193,523 teach that the ester linkage in polyesters can be stabilized against hydrolysis by the incorporation of small amounts of polycarbodiimides and substituted carbodiimides respectively. The broad teachings of these two references include polyester urethanes and polyesteramides as benefiting in their hydrolytic stability by the disclosed method. The polyesteramides are those generally prepared from carboxylic acids, alcohols, and amines or aminoalcohols and aminoacids. Only the hydrolytic stability of the ester linkage was the concern of these two references in respect of the particular types of polymer systems disclosed therein.

SUMMARY OF THE INVENTION

The present invention is directed to fluxed polymer blends comprising (a) a segmented polyesteramide characterized by a recurring unit of the formula

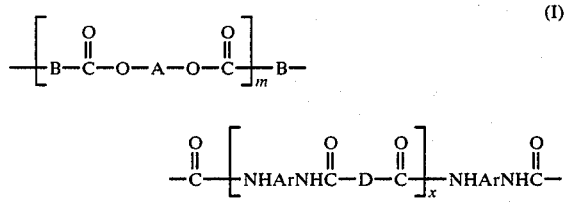

wherein Ar is an arylene radical, A is the residue of a polymeric diol HOAOH having a molecular weight from about 400 to about 4000, B is the residue of a dicarboxylic acid HOOCBCOOH selected from the class consisting of aliphatic dicarboxylic acids having from 6 to 14 carbon atoms, inclusive, and isophthalic and terephthalic acids, m has a mean value of not more than 1 but greater than 0, D is the residue of a dicarboxylic acid HOOCDCOOH such that the melt temperature of the hard segment is not greater than 325° C., and x is a number having an average value from 0 to 10; and (b) a sufficient amount of a carbodiimide containing material selected from the group consisting of a monocarbodiimide, a polycarbodiimide, and mixtures thereof to provide improved compression set for said polyesteramide (a).

The term "arylene radical" means a divalent arylene containing radical derived from an aromatic hydrocarbon having from 6 to 18 carbon atoms, inclusive, such as phenylene, tolylene, xylylene, naphthylene, diphenylylene, and radicals having the formula

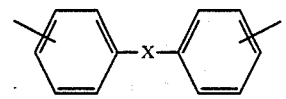

wherein X is selected from the group consisting of $-SO_2-$, $-CO-$, $-O-$, and lower alkylene from $C_1$ to to $C_4$, such as 4,4'-oxydiphenylene, 4,4'-sulfonyldiphenylene, 4,4'-carbonyldiphenylene, 4,4'-isopropylidenediphenylene, 4,4'-methylenediphenylene, 2,4'-methylenediphenylene, 3,3'-dimethyl-4,4'-methylenediphenylene, and the like, and mixtures thereof.

The term "polymeric diol" which is used herein to characterize residue A in formula (I) above is inclusive of polyether, polyester, and polycarbonate diols having molecular weights within the stated range. Illustrative of polyether diols are the poly(alkylene ether)diols obtained by polymerizing one or more cyclic ethers such as ethylene oxide, propylene oxide, butylene oxide and tetrahydrofuran. The poly(alkylene ether)diols are inclusive of polyethylene glycol, polypropylene glycol, poly(tetramethylene glycol), polypropylene glycols capped with ethylene oxide, random copolymers of ethylene oxide and propylene oxide, and adducts of ethylene oxide, propylene oxide and like alkylene oxides with homopolymers of conjugated alkadienes such as butadiene, isoprene and the like, and copolymers of said alkadienes with vinyl monomers such as acrylonitrile, methacrylonitrile, styrene, and the like. Preferred polyether diols for use in preparing the polyesteramides are poly(tetramethylene glycol) and ethylene oxide-capped polypropylene glycols wherein the ethylene oxide content is within the range of about 5 percent to about 40 percent.

Illustrative of the polyester diols are those obtained by reacting a dicarboxylic acid such as adipic, suberic, azelaic, glutaric acids and the like, with an excess, over the stoichiometric amount, of a dihydric alcohol such as ethylene glycol, propylene glycol, 1,4-butanediol, 1,6-hexanediol and the like, including mixtures of two or more such diols. Preferred polyester diols are the poly(tetramethylene)adipates, -suberates, -azelates, and -glutarates.

Illustrative of the polycarbonate diols are those having the recurring polycarbonate linkage $-ROCO_2-$ wherein R can be $C_2$ to $C_{25}$ alkylene, $C_5$ to $C_8$ cycloalkylene, or $C_6$ to $C_{18}$ arylene, and exemplified in U.S. application Ser. No. 840,248 filed Mar. 17, 1986, now U.S. Pat. No. 4,649,180, and the disclosure of which is incorporated herein by reference.

The term "aliphatic dicarboxylic acids having from 6 to 14 carbon atoms" means the acids represented by the formula HOOC—$C_nH_{2n}$—COOH wherein the total number of carbon atoms, including those in the carboxylic groups, lies within the stated range and $C_nH_{2n}$ represents straight or branched chain alkylene having the appropriate carbon atom content. Illustrative of such acids are adipic, pimelic, suberic, azelaic, sebacic, 1,11-undecandioic, and 1,12-dodecandioic, brassylic, α-methyladipic, α,α-dimethyladipic, α-ethylpimelic, α-ethyl-α-methylpimelic, β,β-'-diethyl-β,β'-dimethylsuberic, 2,2,4-trimethyladipic, 2,4,4-trimethyladipic, α,α-dimethylazelaic and α,α,α', α'-tetramethylsebacic acids.

The dicarboxylic acid represented by the formula HOOCDCOOH is a dicarboxylic acid or mixture of two or more dicarboxylic acids the nature of which will be discussed in more detail below.

The term "fluxed" is used in the general sense known to those skilled in the polymer art and means melting or fusing under some type of mechanical agitation.

The term "sufficient amount" as used in reference to the amount of carbodiimide containing material means the amount required to provide an improvement in the compression set of an unannealed or annealed blend of at least 5 or 10 percent respectively over the base polyesteramide.

The term "carbodiimide containing material" means an organic material containing at least one carbodiimide linkage, i.e. (—N=C=N—).

Quite unexpectedly, the fluxing together of the polyesteramides (I) with the carbodiimide containing materials provides blends which have improved compression set values in combination with the already useful properties noted above for said polyesteramides. Even more unexpected, the present blends when annealed provide molded polymers characterized by even better compression set properties over the corresponding unannealed blends.

Surprisingly, the blends in accordance with the present invention are observed to have better physical property retention when exposed to high temperature environments as compared with the base polyesteramides exposed to the same conditions.

Accordingly, the present blends can be compression molded, extruded into any type of profile configuration, or injection molded into complicated shapes which release easily from the mold. The molded articles so obtained have good elastic and high temperature resistance and find utility particularly in gasket materials as well as various types of seals exposed to rigorous conditions such as being cyclically compressed and released at elevated temperatures, in load bearing cushions, tractor pads, and the like.

DETAILED DESCRIPTION OF THE INVENTION

The blends in accordance with the present invention can be prepared in any convenient manner so long as the final blend contains the polyesteramide (I) and the carbodiimide containing component fluxed together. For example, the two components in solid, pelletized, or powdered form can be brought together and dry-blended using conventional means such as a barrel mixer, tumble mixer, and the like prior to being compounded. Alternatively, a solution of the carbodiimide dissolved in an organic solvent can be coated on the polyesteramide and the solvent removed prior to compounding. In yet another embodiment, the carbodiimide component dissolved in a carrier polymer, such as a thermoplastic polyether or polyester based polyurethane, a thermoplastic polyamide, a thermoplastic polyester, and the like, as a concentrate, in powdered or pelletized form, is dry blended with the polyesteramide also in powdered or pelletized form prior to compounding. Optionally, the polyesteramide and carbodiimide can be brought together for the first time in the compounding stage although this is the least preferred method because of the difficulty in accurately metering the small proportional amount of carbodiimide with (I).

The pre-mixed components obtained by any one of the pre-blending techniques noted above are compounded or fluxed in an appropriate melt-extruder, Banbury type internal mixer, rubber mill, twin-screw compounder, and the like. Preferably, the components are processed in a melt extruder from which the blend is extruded in the form of strands and the like which are then pelletized for injection molding purposes. Standard techniques and apparatus well-known in the art can be used for these purposes.

The compounding or fluxing temperature is not critica except to the extent that the components must be fused but not thermally degraded. Advantageously, the temperature can be from about 200° C. to about 300° C.

In the event that the carbodiimide is mixed initially as a solution with the base polymer prior to compounding, any convenient and suitable solvent may be employed. Illustrative but not limiting thereof are ketones such as acetone, methyl butyl ketone, methyl isopropyl ketone; aromatic hydrocarbons such as benzene, toluene, xylene; aliphatic hydrocarbons such as heptane, octane; esters such as ethyl acetate, butyl acetate; chlorinated solvents such as chloroform, carbon tetrachloride, tetrachloroethane, and the like. The concentration of carbodiimide component in the solution is in no way critical and limited only by expediency. Advantageously, the carbodiimide can be present within a range of from about 2 to about 80 weight percent based on the combined weight of solution and solvent. Preferably, the concentration is from about 5 to about 25 percent by weight.

In the event that the carbodiimide is mixed initially as a concentrate in a carrier polymer as noted above, there is no particular limitation on the polymer employed other than it be thermoplastic and fully compatible with the polyesteramide and that its properties do not detract from those of the substrate. Of those carrier polymers illustratively disclosed above, the polyurethanes are preferred as a class, particularly, the polyester polyurethanes. One reason for the use of a polymeric carrier is to assist in the homogenization of the carbodiimide in the polyesteramide and thus avoid any chance of delamination in the extruded blend. Generally speaking, delamination is not a particular problem with the present blends an the use of the concentrate is sometimes preferred as an accurate means for adding the carbodiimide. The concentration of carbodiimide in the concentrate is not critical falling conveniently within a range of from about 5 to about 50 percent by weight of carbodiimide, preferably from about 10 to about 25 percent by weight. The proportion of carrier polymer remaining in the final blends is such that it has a negligible effect on the polyesteramide properties.

The segmented polyesteramide component of the blends can be any of those polyesteramides defined above and whose preparations are described in U.S. Pat.

No. 4,129,715 the disclosure of which is incorporated herein by reference and U.S. application Ser. No. 840,248 filed Mar. 17, 1986, now U.S. Pat. No. 4,649,180, whose disclosure has already been incorporated herein. Detailed procedures for the preparation of the polyesteramides are given in the aforesaid patent and application and will not be repeated herein in the interest of brevity.

Of the various radicals defined above for the polyesteramide, certain preferences are held. For example, in the case of A it is preferred that it be the residue of a polyester diol and most preferably of molecular weight from about 600 to about 2500.

In respect of B it is preferred that it be the residue of an aliphatic dicarboxylic acid having from 6 to 14 carbon atoms, inclusive.

In respect of x it is preferred that it fall within the range of from 0 to 3.

In respect of Ar it is preferred that it be methylenebis(phenylene), more particularly 4,4'-methylenebis(phenylene).

The dicarboxylic acid HOOCDCOOH or mixture of two or more such acids from which the residue D of formula (I) is derived is preferably a straight chain aliphatic dicarboxylic acid having from about 6 to about 9 carbon atoms (inclusive of those in the carboxylic groups) but other dicarboxylic acids can be employed provided that the acids are such that the melt temperature of the hard sector of the polymer into which the said acid is introduced is not raised thereby above about 325° C. Illustrative of such dicarboxylic acids are adipic, azelaic, sebacic, suberic, and trimethyl adipic acids. Particularly preferred are azelaic and adipic as well as a mixture of approxixately equimolar amounts of these two acids.

Accordingly, an overall preferred segmented polyestramide for use in the present blends is characterized by a recurring unit of the formula (II) wherein A, B, D, x, and Ar of formula (I) have the preferred definitions set forth above.

In respect of the carbodiimide containing material defined above, it includes any organic material containing at least one carbodiimide linkage, and, preferably, more than one such linkage. Accordingly, the present invention in its broadest scope comprehends monocarbodiimides, polycarbodiimides (including oligomers), and mixtures of the aforesaid. The monocarbodiimides can be represented by the formula $R^1-N=C=N-R^1$ wherein $R^1$ represents hydrocarbyl; the oligo-, or polycarbodiimides can be represented by the recurring unit $+R^2-N=C=N+_p$ wherein p has a value from about 2 to about 100 and $R^2$ represents the divalent radical equivalent to hydrocarbyl above. The term "hydrocarbyl" means the monovalent radical obtained by removing one hydrogen atom from the parent hydrocarbon having from 1 to 18 carbon atoms. Illustrative of hydrocarbyl are alkyl such as methyl, ethyl, propyl, butyl, pentyl, hexyl, octyl, decyl, dodecyl, hexadecyl, octadecyl, and the like, including isomeric forms thereof; alkenyl such as vinyl, allyl, butenyl, pentenyl, hexenyl, octenyl, decenyl, undecenyl, tridecenyl, hexadecenyl, octadecenyl, and the like, including isomeric forms thereof; ralkyl such as benzyl, phenethyl, phenylpropyl, benzhydryl, naphthylmethyl, and the like; aryl such as phenyl, tolyl, xylyl, naphthyl, biphenylyl, benzylphenyl, and the like; cycloalkyl such as cyclobutyl, cyclopentyl, cyclohexyl, cycloheptyl, cyclomöctyl and the like including isomeric forms thereof; and cycloalkenyl such as cyclopentenyl, cyclohexenyl, cycloheptenyl, cycloöctenyl, and the like, including isomeric forms thereof. Accordingly, the divalent radical $R^2$ includes the corresponding alkylene, alkenylene, arylene, arylene/alkylene, cycloalkylene, cycloalkenylene, and the like.

The $R^1$ and $R^2$ radicals can be substituted by one or a plurality of inert substituents provided the latter are not reactive with isocyanate groups, carbodiimide groups, or polyesteramides. Illustrative of such substituents are halo, i.e. chloro, bromo, fluoro and iodo; nitro; alkoxy from 1 to 8 carbon atoms, inclusive, such as methoxy, ethoxy, propoxy, butoxy, pentyloxy, hexyloxy, heptyloxy, octyloxy and the like, including isomeric forms thereof; and, where appropriate, alkyl of 2 to 18 carbon atoms. The latter alkyl substituents are particularly preferred as inert substituents on one or both of the ortho positions relative to the $-N=C=N-$ linkage when $R^1$ is aryl or $R^2$ is arylene. This will be discussed in more detail below.

The monocarbodiimides, oligomeric, and polycarbodiimides are well known compounds and products, and, in some cases, are commercially available materials. Their prepartion and characterization is fully disclosed in such typical references as the Encyclopedia of Polymer Science and Technology, Vol. 7, pp. 751 to 753, 1967, Interscience Publishers, New York, N.Y.; U.S. Pat. Nos. 2,853,473, 3,502,722, and 3,929,733. The latter three patents are hereby incorporated herein by reference.

In carrying out the preparation of these carbodiimides it is necessary merely to treat the organic isocyanate of polyisocyanate with a catalytic amount of a phospholine or phospholidine oxide or other appropriate catalyst. As the organic carbodiimide is formed, carbon dioxide is liberated and this carbon dioxide is vented from the reaction medium. It is usually desirable to heat the organic isocyanate with the catalyst to a temperature of from about room temperature to about 300° C. It is to be understood that with particularly active organic isocyanates and catalysts, heating may not be necessary, and this temperature range may be varied within the stated limits depending on the particular organic isocyanate and catalyst which are being used.

The preparation may be carried out in bulk or in solution depending on the particular organic isocyanate being used. Thus, when the organic isocyanate is a solid, it may be dissolved in an inert solvent, such as benzene, toluene, xylene, nitromethane, etc., and the appropriate amount of catalyst added. Depending on the solubility of the resulting carbodiimide and the solvent employed, recovery is accomplished by either evaporating the solvent from the soluble organic carbodiimide or filtering off the insoluble organic carbodiimide. In the cases where the organic isocyanate reactant is itself a liquid, the use of an inert solvent is not necessary. In this case, the catalyst is added directly to the organic isocyanate, whereupon the entire mass is converted to the organic carbodiimide.

Illustrative but not limiting of the monoisocyanates which can be employed to prepare the monocarbodiimides are methyl isocyanate, ethyl isocyanate, butyl isocyanate, octyl isocyanate, allyl isocyanate, phenyl isocyanate, o-toluene isocyanate, p-toluene isocyanate, o-nitrophenyl isocyanate, p-chlorophenyl isocyanate, p-methoxyphenyl isocyanate, p-biphenylyl isocyanate, cyclohexyl isocyanate, o-phenylphenyl isocyanate, 2- ethylphenyl isocyanate, 2-isopropylphenyl isocyanate, 2-di-sec.-butylphenyl isocyanate, 2-tertiary-butylphenyl isocyanate, 2,4-diisopropylphenyl isocyanate, 2,4-disec.-butylphenyl isocyanate, 2-ethoxyphenyl isocyanate, 2-isopropoxyphenyl isocyanate, 2-isobutoxyphenyl isocyanate, 2,6-diethylphenyl isocyanate, 2,6-diisopropylphenyl isocyanate, 2,6-di-sec.-butylphenyl isocyanate, 2,6-diethoxyphenyl isocyanate, 2,6-dioctylphenyl isocyanate, 2-isopropoxy-5-octylphenyl isocyanate, 2-isopropyl-6-chlorophenyl isocyanate, 2-di-sec.-butyl-6-nitrophenyl isocyanate, and the like and mixtures thereof.

Preferred of the monoisocyanates for the monocarbodiimide compounds are 2,6-diisopropylphenyl isocyanate, 2,6-diethylphenyl isocyanate and 2,6-di-sec.-butylphenyl isocyanate.

Illustrative, but not limiting of the polyisocyanates, are 2,4-tolylene diisocyanate, m-phenylene diisocyanate, 4-chloro-1,3-phenylene diisocyanate, 4,4'-biphenylene diisocyanate, 1,5-naphthylene diisocyanate, tetramethylene diisocyanate, hexamethylene diisocyanate, 1,4-cyclohexylene diisocyanate, 4,4'-methylene dicyclohexylene diisocyanate, 4,4'-methylenebis(phenyl isocyanate), 1,3-diisopropyl-2,6-phenylene diisocyanate, 1,4-diethyl-phenylene-2,5-diisocyanate, 1-methyl-3,5-diethyl-phenylene-2,4-diisocyanate, 1-methyl-3,5-diethylphenylene-2,6-diisocyanate, 1,3,5-triethyl-phenylene-2,4-diisocyanate, 1,3,5-triisopropyl-phenylene-2,4-diisocyanate, 1,3,5-tri-sec.-butyl-phenylene-2,4-diisocyanate, 3,3'-diethyl-biphenyl-4,4'-diisocyanate, 3,5,3',5'-tetraethyl-diphenylmethane-4,4'-diisocyanate, 3,5,3',5'-tetraisopropyl-diphenylmethane- 4,4'-diisocyanate, 3,5,3',5'-tetra-tertiary-butyl-diphenylmethane-4,4'-diisocyanate, 1-ethyl-4-ethoxy-phenylene-2,5-diisocyanate, 1,3-diethoxyphenylene-4,6-diisocyanate, 1,4-diethoxy-phenylene-2,5-diisocyanate, 4,4'-diethoxydiphenylmethane-3,3'-diisocyanate, 4,4'-diethoxy-diphenyl-disulphide-3,3'-diisocyanate, 4,4'-diethoxy-diphenyl-sulphone-3,3'-diisocyanate, 4,4'-diethoxybenzene-sulphonyl-ethylene-diamine-3,3'-diisocyanate, 4,4'-diethoxybenzene-thioethylene glycol-3,3'-diisocyanate, 3,3'-diethoxy-4,4'-diisocyanatodibenzylthioether, 1,3,5-triethyl-benzene-2,4,6-triisocyanate, 1-ethyl-3,5-diisopropyl-benzene-2,4,6-triisocyanate, 1,3,5-triisopropyl-benzene-2,4,6-triisocyanate, and the like and mixtures thereof.

Preferred of the diisocyanates for the oligo- and polycarbodiimides are 1,3,5-triisopropyl-phenyl-2,4-diisocyanate and 1,3,5-triethyl-phenyl-2,4-diisocyanate.

While any of the carbodiimide materials defined above may be used in the present blends, the preferred ones belong in the polycarbodiimide class and the most preferred belong in the aromatic polycarbodiimides. In this latter connection, it should be noted that some diisocyanates are commercially polymerized in the presence of minor proportions of monoisocyanates as terminators for the polymer chains. This serves the double purpose of allowing for better molecular weight control and for preventing the oligomers and polymers from having free isocyanate end groups. Accordingly, the present oligomeric and polymeric polycarbodiimide components also contemplate mixtures with minor proportions of monocarbodiimide that have arisen from the reaction of two monoisocyanate molecules as a side reaction.

Particularly preferred are the aromatic polycarbodiimides prepared from the hindered diisocyanates set forth above beginning with 1,3-diisopropyl-2,6-phenylene diisocyanate and ending with 1,3,5-triisopropylbenzene-2,4,6-triisocyanate with the individual preferences set forth above for the two particular diisocyanates.

The proportions in which the carbodiimide component is employed is sufficient to give rise to the minimum improvements in compression set values for the base polyesteramide set forth above for the annealed and unannealed sample. It will be readily understood by one skilled in the art that the exact proportions will vary depending on the type of carbodiimide being employed, the base polymer properties, and the like. The optimum amount necessary to satisfy both the compression set improvement and economic considerations can be readily determined. Advantageously, regardless of the form in which it may be employed, the proportion of carbodiimide in the blend can fall within the range of from about 0.2 percent to about 10 percent by weight, preferably from about 0.3 to about 5 percent by weight.

It will be noted that the minimum improvements in compression set values for the present blends have been defined above for both annealed and unannealed samples. Generally speaking, the percent improvement will be considerably higher than the defined minimum values. The annealing process alone gives rise to a compression set improvement but not to the same extent as the incorporation of the carbodiimide alone. The combination of the carbodiimide plus annealing gives rise to an even greater and unexpected compression set improvement. This result was totally unexpected.

Accordingly, it is preferred that the present blends be annealed if maximum compression set improvement is to be realized.

The annealing process is in no way critical and advantageously the temperature can fall within a range of from about 100° C. to about 225° C. for a period of from about 0.5 hour to about 24 hours.

The compositions of the invention can also incorporate various additives so long as they do not detract from the improved compression set. Typical of such additives are fillers, antioxidants, pigments, fire retardants, plasticizers, reinforcing agents such as glass fiber, and the like, which are commonly employed in the art in polyesteramide compositions.

The blends are further characterized by hardness values falling within the range of 70 Shore A to 80 Shore D which are not affected by the carbodiimide.

Furthermore, aside from the improved compression sets of the present blends, for some unexplainable reason the overall thermal properties of the base polyesteramides are improved. This improvement has been observed in respect of such physical properties as tensile set, tensile strength, elongation, and tensile modulus particularly at 300 percent strain.

It is the attainment of the improved compression set and higher resistance to thermal aging which allow the present blends to be greatly improved over the polymers of U.S. Pat. No. 4,129,715. This allows them to be useful in the utilities outlined above which heretofore they were not.

The following preparations and examples describe the manner and process of making and using the invention and set forth the best mode contemplated by the inventors of carrying out the invention but are not to be construed as limiting.

EXAMPLE 1

The following experiment describes the preparation of a blend A in accordance with the present invention using a base polyesteramide prepared in accordance with U.S. Pat. No. 4,129,715.

The polyesteramide was prepared by reacting 548 lbs. (1.0 equiv.) of an azelaic acid terminated polybutylene azelate glycol having an acid equivalent weight of about 548, 115 lbs. (1.22 equiv.) of azelaic acid, and 279.4 lbs. (2.23 equiv.) of 4,4'-methylenebis(phenyl isocyanate) in the presence of 633.5 g. of 1,3dimethylphospholene-1-oxide and 8.45 lbs. of Irganox 1098 (antioxidant supplied by Ciba-Geigy Co.) in about 2100 lbs. of anhydrous tetramethylene sulfone using the procedure described in the aforesaid patent. The resulting segmented polyesteramide had an inherent viscosity (0.5 g./100 ml.) in N-methylpyrrolidone (NMP) at 30° C. of 0.91 and was characterized by a recurring unit of formula (I) above wherein A is the residue of poly(tetramethyleneazelate) glycol, B is the residue of azelaic acid as is D, Ar is 4,4'-methylenebis(phenylene), m has a mean value greater than 0 but less than 1, and x has a value of about 1.22.

A 2270 g. sample of the above polyesteramide in pelletized form was tumble-mixed with a solution consisting of 11.35 g. of Staboxol P dissolved in 100 ml. of chloroform. The Staboxol P is a low molecular weight (less than 5000 $\overline{MW}_n$) aromatic polycarbodiimide supplied by Mobay Chemical Co. Solvent was then removed from the coated pellets first in an air oven (at about 90° C.) followed by drying in a vacuum oven (about 0.2 mm. of mercury) at ambient room temperature. Finally, the coated resin was dried in a hopper drier overnight at 110° C. prior to being fluxed by extrusion. The coated resin was extruded through a Brabender extruder to form ⅛" diameter rope. Extrusion conditions were as follows: barrel size ¾" diameter with L/D of 24/1; single screw straight flight, screw speed of 40 r.p.m.; temperature: zone 1=230° C.; zone 2=225° C.; zone 3=230° C.; zone 4=230° C.; nozzle=257° C. The rope was pelletized and injection molded into 5"×5"×1/16" plaques using a Stubbe 4 oz. injection molder under the following conditions: injection pressure=1250 psi; zone 1=490° F.; zone 2=490° F.; mold temperature =250° F.; injection time=12 seconds; and mold holding time=15 seconds.

Thus there was obtained the blend A containing 0.5 percent w/w of the aromatic polycarbodiimide.

Blend A plaques along with plaques injection molded from a control A sample of just the base polyesteramide alone were annealed at 200° C. for 3 hours. Following this the compression set of the blend A and control A samples were determined at both 100° C. and 125° C. in accordance with ASTM Test Method B of ASTM D395. The percent compression set values were observed as follows.

| Compression Set (%) | Blend A | Control A |
| --- | --- | --- |
| at 100° C. | 51 | 58 |
| at 125° C. | 57 | 63 |

Blend A possessed a 12 percent and 10 percent superior compression set at 100° C. and 125° C., respectively, as compared with Control A at these temperatures.

EXAMPLE 2

Using a base polyesteramide identical to that in Example 1 above but prepared in a different batch, there was prepared a blend B in accordance with the present invention containing 0.3 percent w/w of aromatic polycarbodiimide. A 1362 g. sample of the pelletized resin was tumbled in a glass jar with 4.09 g. of the Staboxol P described above but in dry powder form for about 10 minutes. The coated pellets were then fluxed and extruded into rope, pelletized, then injection molded into plaques using virtually identical extrusion and molding conditions described above in Example 1 except for a shorter mold holding time of 5 seconds.

Blend B plaques along with plaques molded from a control B sample of just the base polyesteramide alone were annealed at 200° C. for 3 hours. Compression sets for the blend B and control B were determined at 100° C. and were 50 percent and 59 percent respectively. Blend B possessed a 15 percent superior compression set as compared with control B.

EXAMPLE 3

Using a base polyesteramide identical to that in Example 1 above, but containing 0.5 percent of a lubricant (Advawax 280 supplied by Morton Thiokol Inc.) instead of Irganox 1098, there was prepared a blend C in accordance with the present invention containing 1.5 percent w/w of an aromatic polycarbodiimide. A 2043 g. sample of the pelletized resin was tumble-mixed with 227 g. of a preblended and pelletized mixture consisting of a polyester based thermoplastic polyurethane [based on a 700 molecular weight polyethylene adipate, 1,4-butanediol and 4,4'-methylenebis(phenyl isocyanate); 95 Shore A hardness] containing 15 percent by weight of Staboxol P-100. The latter is an aromatic polycarbodiimide having a recurring linkage derived from 1,3,5-triisopropyl-2,4-diisocyanatobenzene and a weight average molecular weight of about 10,000 and is supplied by Rhine Chemie.

The blend was fluxed by extrusion through a Brabender extruder to form ⅛" diameter rope using the conditions as follows: barrel size of ¾" diameter with L/D of 24/1; single screw-flight, screw speed - 30 r.p.m; temperatures: zone 1=220° C.; zone 2=225° C.; zone 3=225° C.; zone 4=230° C.; nozzle=248° C. The rope was pelletized then injection molded into 5"×5"×1/16" plaques using an Arburg Model 305 injection molding machine with molding conditions as follows: pressure=1400 psi; temperatures: zone 1=265° C.; zone 2=270° C.; zone 3=265° C.; zone 4=265° C.; mold temperature=80° C.; injection time=1.3 seconds; mold holding time=8 seconds; and cooling time=25 seconds.

Some of the blend C plaques were annealed at 150° C. for 20 hours while some were left unannealed. Plaques of similarly prepared base polyesteramide alone as control C were treated similarly in that some were exposed to the above annealing conditions while others were not. The compression sets of the blend C and control C samples were determined both at ambient room temperature (about 21° C.) and at 100° C. in accordance with ASTM Test Method B or ASTM D395. The percent compression set values were observed and recorded as follows as average values determined from at least two independent measurements.

| Compression Set (%) | Blend C | Control C |
| --- | --- | --- |
| at 21° C. | | |
| unannealed | 27.3 | 32.1 (29) |
| annealed | 19.1 | 28.3 (32.1) |
| at 100° C. | | |
| unannealed | 74.0 | 80.1 |
| annealed | 38.1 | 45.6 |

While the annealing process appears to benefit the compression set values of blend C and control C, it is quite clear that the aromatic polycarbodiimide component gives rise to a greater lowering of the compression set than does the annealing, e.g. compare the approximate 15 percent improvement in the compression set of the unannealed blend C compared with the unannealed control C. At the 21° C. measurement temperature the annealing step combined with the aromatic polycarbodiimide component gives rise to a much greater compressive set improvement (about 30 percent improvement of annealed blend C over unannealed) versus only the annealing in control C which provides about 12 percent improvement. At the higher measurement temperature of 100° C., the same relationships hold for blend C over control C but at lower improvement levels.

The thermoplastic polyurethane was employed simply as a carrier for the carbodiimide and to avoid any tendency for delamination of the blend during fluxing or injection molding. Test plaques prepared from a blend of the base polyesteramide and an 8.5 percent by weight content of only the polyurethane carrier without the polycarbodiimide had compression set values measured at 21° C. that varied little from the control C (see percent compression set values in parenthesis after the control C values).

EXAMPLE 4

Using the same base polyesteramide and Staboxol P-100 set forth in Example 3 but with the latter in dry powder form (vacuum dried at 80° C. for 1.5 hours at 0.2 mm. of mercury), three blends (D, E, and F) in accordance with the present invention were prepared. Three samples of the pelletized polyesteramide were tumble-mixed with the powdered P-100 described above in such proportions that 0.75 percent, 1.25 percent, and 2 percent by weight blends respectively were obtained. The blends were fluxed by extrusion through a Leistritz counter-rotating twin screw extruder (Model LSM 36/30.34) using the following conditions: feed rate: 100 g./min.; screw speed=65 rpm; pressure 360 psi; temperatures: zone 1=428° F.; zone 2=458° F.; zone 3=462° F.; zone 4=456° F.; zone 5=455° F.; zone 6=451° F.; die=437° F.; and power=9 amps. The fluxed polymers obtained as ⅛" rope were pelletized and each lot injection molded into 5"×5"×1/16" plaques using the Arburg described above under the following conditions: pressure 1600 psi; temperatures: zone 1=260° C.; zone 2=295° C.; zone 3=295° C.; nozzle=285° C.; mold temperature=90° C.; injection time 0.6 sec.; mold holding time=8 seconds; and cooling time=25 seconds.

Samples of the plaques were left unannealed while duplicates were annealed at 150° C. for 20 hours. Their respective compression sets were obtained at room temperature and are set forth below.

| Compression set (%) | Blend | | |
| --- | --- | --- | --- |
| at 21° C. | D | E | F |
| unannealed | 33.3 | 39.7 | 33.6 |
| annealed | 26.9 | 25.4 | 22.8 |

EXAMPLE 5

Using the same base polyesteramide and Staboxol P-100 set forth in Example 4, a blend G in accordance with the present invention was prepared by dry-blending together in a 1 gallon bottle the pelletized resin and powdered Staboxol P-100 in such proportions by weight to provide the polycarbodiimide in 1.25 percent by weight.

The coated pellets were fluxed by extrusion into ⅛" rope using the Leistritz apparatus under the same conditions set forth in Example 4. The rope was pelletized and then injection molded into the 5"×5"×1/16" plaques using the Arburg injection molding apparatus under the same conditions set forth above in Example 4.

Samples of the molded blend G and control G consisting only of the molded base polyesteramide without the polycarbodiimide component were exposed to a heat aging study whereby the samples were stored at 150° C. for an extended period. At periodic intervals a plaque of blend G along with a plaque of control G were removed and their respective physical properties measured. The following Table I sets forth the measured properties over a 67 day period for the samples with values for the control G in parenthesis.

The tensile strength, elongation, and tensile set properties of blend G show a much superior retention over the 67 day period compared with control G. At the same time the modulus values of blend G show higher values, particularly at 100 and 300 percent which properties are maintained over the 67 day duration of the test.

Accordingly, the blend G shows overall superior heat stability over the control G.

TABLE I

| Properties | Modulus (psi) | | | Tensile Str. | Elongation | Tensile | Hardness |
| --- | --- | --- | --- | --- | --- | --- | --- |
| | 50% | 100% | 300% | (psi) | % | Set (%) | Shore A |
| Days at 150° C.: | | | | | | | |
| Initial | 1550 | 1940 | — | 3400 | 280 | 20 | 90 |
| | (1510) | (1670) | (2760) | (3510) | (410) | (60) | (93) |
| 2 | 1430 | 1950 | 3730 | 3830 | 320 | 20 | 90 |
| | (1530) | (1810) | (2610) | (3680) | (510) | (80) | (93) |
| 4 | 1520 | 2040 | 3830 | 3960 | 310 | 20 | 90 |
| | (1510) | (1770) | (2330) | (3380) | (530) | (100) | (93) |
| 7 | 1480 | 1970 | 3700 | 3860 | 320 | 20 | 89 |
| | (1510) | (1720) | (2200) | (2880) | (500) | (100) | (91) |
| 11 | 1490 | 2020 | 3800 | 4040 | 320 | 20 | 92 |
| | (1450) | (1680) | (2060) | (2620) | (510) | (100) | (91) |
| 17 | 1340 | 2220 | 3360 | 3900 | 350 | 20 | 90 |

TABLE I-continued

| Properties | Modulus (psi) 50% | 100% | 300% | Tensile Str. (psi) | Elongation % | Tensile Set (%) | Hardness Shore A |
|---|---|---|---|---|---|---|---|
|  | (1350) | (1600) | (1950) | (2370) | (500) | (110) | (91) |
| 27 | 1230 | 1690 | 3100 | 3720 | 420 | 30 | 93 |
|  | (1420) | (1630) | (2030) | (2300) | (450) | (80) | (89) |
| 42 | 1160 | 1560 | 2580 | 3110 | 370 | 30 | 91 |
|  | (1290) | (1600) | (2160) | (2340) | (370) | (50) | (91) |
| 67 | 1240 | 1720 | 2930 | 3170 | 340 | 38 | 91 |
|  | (1150) | (1450) | (—) | (1920) | (250) | (30) | (91) |

We claim:

1. A fluxed polymer blend comprising
(a) a segmented polyesteramide characterized by a recurring unit of the formula

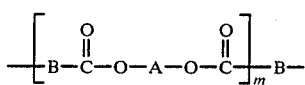

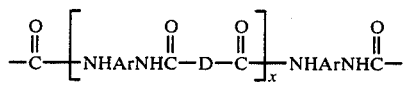

(I)

wherein Ar is an arylene radical, A is the residue of a polymeric diol HOAOH having a molecular weight from about 400 to about 4000, B is the residue of a dicarboxylic acid HOOCBCOOH selected from the class consisting of aliphatic dicarboxylic acids having from 6 to 14 carbon atoms, inclusive, and isophthalic and terephthalic acids, m has a mean value of not more than 1 but greater than 0, D is the residue of a dicarboxylic acid HOOCDCOOH such that the melt temperature of the hard segment derived therefrom is not greater than 325° C., and x is a number having an average value from 0 to 10; and
(b) a sufficient amount of a carbodiimide containing material selected from the group consisting of a monocarbodiimide, a polycarbodiimide, and mixtures thereof to provide an improvement in the compression set of an unannealed or annealed blend of at least 5 or 10 percent respectively over the base polyester amide (a).

2. A blend according to claim 1 wherein said sufficient amount of (b) is from about 0.2 percent to about 10 percent by weight of said blend.

3. A blend according to claim 2 wherein said (b) is a polycarbodiimide.

4. A blend according to claim 3 wherein said (b) is an aromatic polycarbodiimide.

5. A blend according to claim 1 wherein A in said (I) is the residue of a polyester glycol.

6. A blend according to claim 1 wherein B in said (I) is the residue of an aliphatic dicarboxylic acid having from 6 to 14 carbon atoms, inclusive.

7. A blend according to claim 1 wherein x in said (I) has a value from 0 to 3.

8. A blend according to claim 1 wherein D in said (I) is the residue of an aliphatic dicarboxylic acid.

9. A blend according to claim 1 wherein Ar represents 4,4'-methylenebis(phenylene).

10. A fluxed polymer blend comprising
(a) a segmented polyesteramide characterized by a recurring unit of the formula

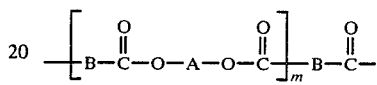

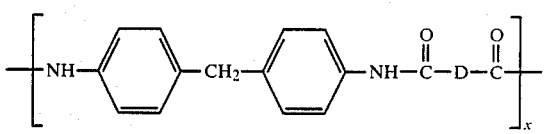

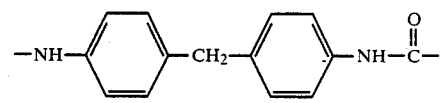

(II)

wherein A is the residue of a polyester glycol HOAOH having a molecular weight from about 400 to about 4000, B is the residue of an aliphatic dicarboxylic acid having from 6 to 14 carbon atoms, inclusive, m has a mean value of not more than 1 but greater than 0, D is the residue of an aliphatic dicarboxylic acid HOOCDCOOH such that the melt temperature of the hard segment derived therefrom is not greater than 325° C., and x has an average value in the range of about 0 to 3; and
(b) a sufficient amount of an aromatic polycarbodiimide to provide an improvement in the compression set of an unannealed or annealed blend of at least 5 or 10 percent respectively over the base polyesteramide (a).

11. A blend according to claim 10 wherein A and B in said (II) are the residues of a poly(tetramethylene azelate) glycol and azelaic acid respectively.

12. A blend according to claim 11 wherein said sufficient amount of (b) is from about 0.2 percent to about 10 percent by weight of said blend.

13. A blend according to claim 12 wherein said polycarbodiimide is derived from 1,3,5-triisopropyl-2,4-diisocyanatobenzene.

14. A blend according to claim 13 wherein D in said (II) is the residue of azelaic acid.

15. An annealed blend according to claim 1.

* * * * *